United States Patent
Liu

(10) Patent No.: US 9,656,297 B1
(45) Date of Patent: May 23, 2017

(54) STEEL PRETREATMENT SOLUTION AND METHOD FOR ENHANCED CORROSION AND CATHODIC DISBONDMENT RESISTANCE

(71) Applicant: Jiong Liu, East Brunswick, NJ (US)

(72) Inventor: Jiong Liu, East Brunswick, NJ (US)

(73) Assignee: NEI Corporation, Somerset, NJ (US)

( * ) Notice: Subject to any disclaimer, the term of this patent is extended or adjusted under 35 U.S.C. 154(b) by 0 days.

(21) Appl. No.: 13/924,836

(22) Filed: Jun. 24, 2013

Related U.S. Application Data

(60) Provisional application No. 61/663,471, filed on Jun. 22, 2012.

(51) Int. Cl.
  *B05D 3/02* (2006.01)
  *B05D 5/00* (2006.01)

(52) U.S. Cl.
  CPC ...................... *B05D 5/00* (2013.01)

(58) Field of Classification Search
  CPC ....................................................... B05D 5/00
  USPC ......................................................... 427/386
  See application file for complete search history.

(56) References Cited

U.S. PATENT DOCUMENTS

| | | | |
|---|---|---|---|
| 5,108,793 A | 4/1992 | van Ooij | |
| 5,322,713 A | 6/1994 | van Ooij | |
| 5,433,976 A | 7/1995 | van Ooij | |
| 5,439,493 A * | 8/1995 | Kirschner | 51/309 |
| 7,507,480 B2 | 3/2009 | Sugama | |
| 2010/0038250 A1* | 2/2010 | Matsukawa et al. | 205/80 |

* cited by examiner

*Primary Examiner* — Robert S Walters, Jr.
(74) *Attorney, Agent, or Firm* — William L. Botjer

(57) ABSTRACT

A pretreatment solution and process for pretreating steel substrates with an aqueous solution to form a thin partially crosslinked layer that passivates the steel surface and inhibits the formation of flash rust, in which the thin partially crosslinked layer is dried in ambient air, and the dried layer enhances the cathodic disbondment resistance of the overlying paint system. In the process an aqueous precursor solution (A) containing at least one amino-functional silane, at least one of a dissolved silicate or a dissolved aluminate and at least a metal salt; is mixed with an aqueous precursor solution (B) containing at least an epoxy resin. The molar amount of amino-functional silane in precursor solution (A) is at considerably lower than the stoichiometric amount that is needed for completing the crosslinking reaction with the epoxy resin in precursor solution (B) so that unreacted epoxy groups are made available for further crosslinking with the overlying paint.

16 Claims, No Drawings

STEEL PRETREATMENT SOLUTION AND METHOD FOR ENHANCED CORROSION AND CATHODIC DISBONDMENT RESISTANCE

CROSS REFERENCE TO RELATED APPLICATIONS

This application claims priority of U.S. Provisional application Ser. No. 61/663,471 filed Jun. 22, 2012; the disclosure of which is hereby incorporated by reference.

STATEMENT OF GOVERNMENT SUPPORT OF THE INVENTION

This invention was made with Government support under Contract No. N00024-08-C-4142 awarded by the Department of Defense. The Government has certain rights in the invention.

FIELD OF THE INVENTION

The present invention relates to providing an environmentally friendly surface pretreatment solution and method for steel substrates to improve the corrosion resistance, paint adhesion and cathodic disbondment resistance. More particularly, the invention relates to a process for pretreating steel substrates with an aqueous solution to form a thin partially crosslinked layer that passivates the steel surface and inhibits the formation of flash rust, in which the thin partially crosslinked layer is dried in ambient air, and the dried layer enhances the adhesion and cathodic disbondment resistance of the overlying paint system.

BACKGROUND OF THE INVENTION

Steel is widely used in the construction, transport and energy industries due to its high strength and relatively low production cost. Steel structures, particularly those made of high temperature and/or carbon steels, are usually painted with protective coatings to prevent them from corrosion. Before painting, the steel substrates need to be properly cleaned, e.g., by grit blasting or power tool cleaning, so that the loosely bonded mill scale and rust are removed to ensure good paint adhesion. A problem that has long been plaguing the painting operations on large steel structures is the formation of "flash rust" on cleaned steel surfaces, i.e., red rust reforms after the surface is cleaned, especially in humid environments. For this reason, paint suppliers usually specify a very short time window for painting after the surface preparation step (e.g., within 8 hours). This is not desirable from an efficiency and flexibility point of view, particularly when a large surface area needs to be painted.

There have been various pretreatment coatings that can minimize the formation of flash rust. Chromate and phosphate conversion coatings are widely used on steels to improve the corrosion resistance. These coatings usually require rinsing of the metal substrate to remove applied pretreatment solution. Moreover, hexavalent chromium compounds used in these systems are classified as carcinogenic. For these reasons, chromate and phosphate conversion coatings are undesirable for large-area industrial applications.

Much effort has been made in developing compositions and methods for producing chromium-free pretreatments. U.S. Pat. No. 7,507,480 describes metal surfaces having thereon an ultrathin (e.g., less than ten nanometer thickness) corrosion-resistant film, which is said to render the metal surface corrosion-resistant. The corrosion-resistant film includes an amido-functionalized silanol component in combination with rare-earth metal oxide nanoparticles. The corrosion-resistant film according to this patent is preferably dried at elevated temperatures.

U.S. Pat. No. 5,108,793 describes forming a silica coating by rinsing the steel with an alkaline solution containing dissolved silicate and metal salt, at an elevated temperature preferably at least 45° C. The steel is dried to form a silica coating having a thickness of at least 2 nm, Thereafter, the silica coated steel is rinsed with an aqueous solution containing 0.5-5 Vol. % organofunctional silane. If the sheet is painted, the silane film forms an adherent bond between the paint and silicate coating. The silane forms a relatively adherent covalent bond between the silicate coating and an outer paint layer. However, the method described in this patent involves two separate rinsing steps and a drying step in between.

U.S. Pat. No. 5,322,713 describes metal sheet protected against corrosion by a silane treated inorganic aluminate coating. A thin aluminate coating was formed by immersing a galvanized steel sheet into an alkaline solution containing 0.005M dissolved aluminate for about 30 seconds. The sheet was dried to form an adherent aluminate coating having a thickness of at least 5 nm. The aluminate coated sheet was immersed into a solution containing preferably 1.0 vol. % hydrolyzed organofunctional silane for about 5 seconds forming a silane film having a thickness of at least 2 nm on the outer surface of the aluminate coating. Thereafter, the silane treated aluminate coated sheet was painted. The silane film formed a covalent bond between the outer paint layer and the inner aluminate layer. A steel sheet treated with the silane sealed aluminate coating was said to have good corrosion protection, good paint chipping resistance and good paint formability. Again, the method described in this patent involves two separate rinsing steps and a drying step in between.

U.S. Pat. No. 5,433,976 describes painted metal sheet pretreated with an insoluble, composite layer containing siloxane. The composite layer is formed by rinsing the sheet with an alkaline solution containing at least 0.005M of a dissolved silicate or a dissolved aluminate, preferably at least 0.8 vol. % of an organofunctional silane and at least 0.2 vol. % of a crosslinking-agent having two or more trialkoxysilyl groups. After the sheet is dried, the composite layer has a thickness of at least 1 nm. After being painted, the siloxane is said to form a tenacious covalent bond between the paint and the metal substrate.

As evidenced by the effort of previous workers, good paint adhesion is always a sought-after feature for a paint system. Poor adhesion is related to common coating degradation mechanisms such as peeling, flaking, blistering, corrosion creep and cathodic disbonding. Among those, cathodic disbonding is an important degradation mechanism for organic coatings on steel structures subjected to coating damage that exposes bare metal to the environment. The mechanism of cathodic disbonding is not understood in every detail. Researchers have generally agreed that the cathodic reactions due to the corrosion of the exposed metal leads to the formation of an alkaline water film under the coating that causes the disbonding. Studies have shown that cathodic disbonding represents the most severe form of adhesive bond degradation. It is known that coatings with good cathodic disbondment resistance tend to have long service life in the field. For this reason, the cathodic disbondment resistance is considered as a key property for paint systems that are exposed to aggressive outdoor environments. However, this property was largely neglected for prior steel pretreatment methods.

In view of the foregoing, one of the objectives of the present invention is to provide an easy, simple and environmentally friendly pretreatment solution and method for steels, which method can temporarily passivate the cleaned steel surfaces and inhibit the formation of flash rust in humid environments, thereby extending the time window for painting operation. The present method does not use toxic materials, does not include steps at elevated temperatures and does not involve complex multiple-step processing.

Another objective of the present invention is to provide a steel pretreatment solution and method that can enhance the adhesion and cathodic disbondment resistance of the overlying paint systems, therefore extending the service life of the paint systems.

SUMMARY OF THE INVENTION

The present invention is a pretreatment solution and method for depositing in a single step a partially crosslinked thin-film coating on a steel surface to improve corrosion resistance, paint adhesion and cathodic disbondment resistance. By partially crosslinked it is meant that the molar ratio of the organic functional groups responsible for the crosslinking reactions in the coating is off stoichiometry so that the crosslinking reaction is not fully completed. The term "thin-film" is defined as having a coating thickness less than 2 microns.

The invention includes wetting the steel surface with a water-borne solution prepared by mixing two aqueous precursor solutions (A) and (B), wherein (A) is a solution containing at least an amino-functional silane, at least one of a dissolved silicate or a dissolved aluminate and at least a metal salt; and (B) contains at least a water-borne epoxy resin.

The wetted substrate is then dried at room temperature in open air to form a composite layer tightly bonded to the steel. The composite layer is partially crosslinked, thereby allowing the penetration of the overlying paint and the formation of a tenacious interpenetrating network at the steel-paint interface. The term "interpenetrating network" means a crosslinked structure resulted from the interdiffusion of the paint and the composite pretreatment layer.

DESCRIPTION OF THE PREFERRED EMBODIMENTS

The present invention is directed to an environmentally friendly pretreatment method for steel surfaces before painting. As used herein, the term "steel" means an alloy of iron and other elements, in which iron is present in an amount at least equal to that of any other element. The steels include cold rolled and hot-rolled steels, electro-galvanized steel, and hot-dipped galvanized steel. The present invention is particularly useful for improving the flexibility of painting operations and enhancing corrosion resistance and service life of paint systems on large-area steel structures, as those used in the construction, transport and energy industries.

An important aspect of the present invention is that by depositing a partially crosslinked thin-film coating on a steel surface the corrosion resistance of the steel as well as the adhesion and cathodic disbondment resistance of the overlying paint system can be significantly enhanced. The formation of the partially crosslinked thin-film coating according to the present invention involves an epoxy-amine crosslinking chemistry, wherein an amino-functional silane reacts with an epoxy resin. The amino-functional silane and epoxy resin are the components of two separate precursor solutions (A) and (B), respectively. The two precursor solutions are mixed before application. The crosslinking reaction occurs upon drying of the mixed solution on the steel surface. As such, the pretreatment coating according to the present invention is particularly suitable for epoxy-based paint systems.

The two precursor solutions (A) and (B) may be mixed in any suitable ratio as long as the concentrations of the constituents in the final mixed solution fall in the ranges that are defined as follows. For the sake of simplicity, a 1:1 weight ratio is preferred.

It is critical that the molar amount of amino-functional silane in the precursor solution (A) is substantially lower (e.g., at least two times lower, preferably at least ten times lower) than the stoichiometric amount that is needed for completing the crosslinking reaction with the epoxy resin in precursor solution (B), so that unreacted epoxy groups are made available for further crosslinking with the overlying paint. Due to the off stoichiometry, a partially crosslinked pretreatment coating is formed which facilitates the interdiffusion between the pretreatment coating and the overlying paint. In particular, the unreacted epoxy groups in the pretreatment layer can further react with the amine groups diffused from the overlying paint, thereby forming a tenacious interpenetrating network at the steel-paint interface.

The amino-functional silane according to the present invention has a general formula of $R_1$—$R_2$—$Si(OR_3)_3$ where $R_1$ is an amino functional group, $R_2$ is an aliphatic or aromatic hydrocarbon group and $R_3$ is an alkyl group. For example, $R_1$ can be $NH_2$— or $H_2NC_2H_4NH$—, $R_2$ can be a propyl group and $R_3$ preferably is $CH_3$— or $CH_3CH_2$—. Alternative groups for $R_2$ include any $(CH_2)_n$ chain with n preferably being the integer 3. Examples of preferred amino-functional silane are 3-aminopropyltriethoxysilane (APS) and N-(2-aminoethyl)-3-aminopropyltrimethoxysilane.

A preferred embodiment of the present invention employs the amino-functional silane at very low concentrations. The concentration of the amino-functional silane(s) in precursor solution (A) is in a range of 0.01-1 wt % (corresponding to a range of 0.005-0.5 wt % in the mixed pretreatment solution), preferably is in a range of 0.03-0.3 wt % (corresponding to a range of 0.015-0.15 wt % in the mixed pretreatment solution). The pretreatment coatings derived from solutions containing an amino-functional silane at lower concentrations were surprisingly more resistant to cathodic disbonding. The results are presented in the Examples. In this regard, the present invention provides advantages as compared with previous pretreatment methods employing amino-functional silanes. For example, Su et al. reported that amino silanes, due to their exceptionally water-soluble nature, can react with the organic paints and damage the paint integrity. Consequently, the paint becomes more permeable to moisture, which leads to poor corrosion protection (see: S. H. Su, K. L. Guyer, A. S. Borovik and C. M. Byrne, *Waterborn Silane Conversion Coating for Replacement of Phosphate/Chromate Pretreatments*, Marketing Bulletin, MOM-113-080-30E-GL, Momentive Performance Materials Inc., 03/11). According to the present invention, the concentration of the amino-functional silane(s) is so low that no negative effects on paint systems occur.

The epoxy resin according to the present invention is an aqueous dispersion of a solid epoxy resin. Exemplary solid epoxy resins, as such or already present in dispersed form, for example, are commercially available from companies such as Dow Chemical Company, USA; Huntsman International LLC, USA; or Momentive Specialty Chemicals Inc., USA. The aqueous dispersion of a solid epoxy resin preferably has a content of solid epoxy resin of 30 to 80 wt %, in particular, 50 to 70 wt %. The average particle size of the dispersed particles of solid epoxy resin in the dispersion is, in particular in the range of 0.05 to 20 μm, especially 0.1 to 10 μm, more preferably 0.2 to 5 μm. For example, suitable aqueous dispersions of a solid epoxy resin are commercially available from Cognis under the trade name Waterpoxy® 1422 or from Air Products under the trade name Ancarez™ AR555 Waterborne Epoxy Resin.

The concentration of the solid epoxy resin in precursor solution (B) is in a range of 0.5-5 wt % (corresponding to a range of 0.25-2.5 wt % in the mixed pretreatment solution), preferably is in a range of 1-3 wt % (corresponding to a range of 0.5-1.5 wt % in the mixed pretreatment solution). A concentration of the solid epoxy resin lower than the defined range may lead to a coating not thick enough and being pervious to moisture. On the other hand, a concentration of the solid epoxy resin higher than the defined range may result in poor adhesion, as the epoxy resin becomes excessive at the steel-paint interface and cannot be fully crosslinked.

Another important aspect of the present invention is that the precursor solution (A) for forming the steel pretreatment coating contains at least one of a dissolved silicate, a dissolved aluminate or a mixture of the silicate and the aluminate. The dissolved silicate or aluminate in the pretreatment solutions lead to a thin inorganic layer that bonds strongly with the steel substrate, and at the same time provides hydroxyl groups that can form covalent bond with the amino-functional silane. Examples of silicates that can be used include $Na(SiO_3)_x$, e.g., waterglass, sodium metasilicate or sodium polysilicate. Examples of aluminates that can be used include sodium aluminate, potassium aluminate and lithium aluminate with sodium aluminate being preferred. The concentration of the dissolved silicate or aluminate in precursor solution (A) is in a range of 0.005-0.1 M, preferably is in a range of 0.01-0.04 M.

Another important aspect of the present invention is that the precursor solution (A) for forming the steel pretreatment coating contains at least a metal salt. The function of the metal salt is for making the inorganic silicate or aluminate layer insoluble. Examples of the metal salt that can be used include $Ba(NO_3)_2$, $Ca(NO_3)_2$, $Sr(NO_3)_2$, or $Fe(NO_3)_3$. The concentration of the metal salt in precursor solution (A) is in a range of 0.001-0.1 M, preferably is in a range of 0.005-0.03 M.

Optionally, conventional additives for coatings may be further added to the precursor solutions for forming the steel pretreatment coating. Examples of additives include wetting agent, colorants, corrosion inhibitors and the like.

A steel substrate suitable for pretreatment is typically cleaned to remove mill scale and rust by grit blasting or power tool cleaning. The mixed pretreatment solution from precursor solutions (A) and (B) can then be applied by spraying, brushing or dipping, in ambient conditions. A preferred application method is by spraying, which allows the control of coating weight and minimize any run-off of excess pretreatment coating solution. The pretreatment coating solution may be deposited by one mist coat or multiple coats. In one embodiment of the present invention, an elevated treatment temperature is not required. The pretreatment coating is dried in ambient air conditions in about two hours. The pretreatment coating can be applied to a final thickness of about 1 nm to 2 μm, more preferably 5 nm to 500 nm. The pretreated steel surface may be painted right after the pretreatment (e.g., as soon as the surface is dried), or after being exposed in ambient condition for a long time (e.g., up to 4 weeks), during which time no flash rust is formed.

In one embodiment of the present invention, the precursor solutions use water as a solvent and do not contain any hazardous chemicals. The pretreatment method is easy, simple and cost-effective. The pretreatment coating can temporarily passivate the cleaned steel surfaces and inhibit the formation of flash rust in humid environments, thereby extending the time window for painting operation.

The pretreatment method according to the present invention leads to significantly enhanced paint adhesion and cathodic disbondment resistance, therefore extending the service life of the paint systems. In one embodiment of the present invention, the pretreatment method may be used to reduce the minimum requirements on surface preparation, thereby providing certain economic and environmental benefits. For example, grit-blasting is a common surface preparation method for painting large-area steel structures. The grit-blasting method involves mechanical cleaning by the continuous impact of abrasive particles at high velocities onto the steel surface, either in a jet stream of compressed air or by centrifugal impellers. The process can be 100% efficient in the removal of mill scale and rust. Grit blasting enhances adhesion by developing a micro-rough surface and mechanically interlocking the paint molecules between the hills and valleys of the rough surface. In spite of its effectiveness, the grit-blasting process is expensive, labor-intensive, time-consuming, and leads to the formation of hazardous powdery waste of the abrasive blast media, which not only poses a hazard to the workers but can also get released into the environment. There is a need for less hazardous and lower cost alternative surface preparation techniques that can at the same time provide good paint adhesion and extended service life.

The pretreatment solution and method according to the present invention may be used to reduce the need of grit blasting, for painting steel structures, from a requirement of SSPC (The Society of Protective Coatings) SP-10 to SSPC SP-6. SP-10 specifies a "near white" level of surface cleanliness with at least 95% of the surface free of visible residues. SP-10 surface preparation is a standard practice for painting steel structures in many industries, particularly for OEM applications. This level of grit blasting is very time consuming, costly, and is an environmental issue because it generates huge volumes of hazardous waste due to the large amount of metal surface removed in producing a metal surface profile of 2-3 mils. SP-6 is commercial blast cleaning which specifies that two-thirds of the surface area is free of all visible residues. This reduced level of surface preparation results in a significant reduction in labor and hazardous waste, lowering overall costs. The present pretreatment solution and method may also be used with other surface preparations such as SP-3 power tool cleaning and SP-12 water jet cleaning.

Examples 1-4, Comparative Example and Control Example a

The aqueous precursor solutions for Examples 1-4 and a comparative example (i.e., Comp. Ex.) were prepared in accordance with the compositions listed in Table 1. De-ionized water was used for all the solutions. Sodium metasilicate, calcium nitrate tetrahydrate, iron nitrate nonahydrate and 3-aminopropyltriethoxysilane (APS) were used for precursor solution (A). The epoxy resin used for precursor solution (B) was Ancarez™ AR555, a water-borne epoxy resin supplied by Air Products. Precursor solutions (A) and (B) were mixed in a 1:1 weight ratio before the pretreatment. Q-Panel brand cold-roll steel (CRS) panels with a dull matte finish were used for the substrate. The mixed pretreatment solutions were applied with an air-spray bottle to as-received CRS panels. The pretreated samples were air dried at room temperature for 4-5 hours and then painted with Intertuf 262, an epoxy paint from International Paints Ltd. The dry film thickness of the paint was about 8 mils (200 μm).

TABLE 1

| Sample ID | Precursor (A) Composition | Precursor (B) Composition | Cathodic Disbondment Radius (mm) | Scribe Creep (mm) |
|---|---|---|---|---|
| Ex. 1 | 0.02M $Na_2SiO_3$, 0.01M $Ca(NO_3)_2$, 0.2 wt % APS | 3.6 wt % AR555 | 9.2 | 4.1 |
| Ex. 2 | 0.02M $Na_2SiO_3$, 0.01M $Ca(NO_3)_2$, 0.6 wt % APS | 3.6 wt % AR555 | 11.3 | 3.7 |
| Comp. Ex. | 0.02M $Na_2SiO_3$, 0.01M $Ca(NO_3)_2$, no APS | 3.6 wt % AR555 | 29.8 | 28.3 |
| Ex. 3 | 0.02M $NaAlO_2$, 0.01M $Fe(NO_3)_3$, 0.2 wt % APS | 3.6 wt % AR555 | 10.1 | 5.2 |
| Ex. 4 | 0.02M $NaAlO_2$, 0.01M $Fe(NO_3)_3$, 0.6 wt % APS | 3.6 wt % AR555 | 12.0 | 5.0 |
| Ctrl. Ex. A | No pretreatment | | 15.0 | 9.2 |

The cathodic disbondment resistance of the painted panels was evaluated with a modified ASTM G8 test. A ¼" holiday was drilled at the center of each painted panel which is electrically connected with a magnesium anode. The panels were immersed in an electrolyte solution containing 1% NaCl, 1% $Na_2CO_3$ and 1% $Na_2SO_4$. The solution potential of the magnesium anode was −1.47V with respect to a $CuCuSO_4$ reference electrode in the electrolyte solution. The test was run for 90 hours under ambient lab conditions. After that the panels were taken out from the test cell and rinsed with tap water. The delaminated coating around the holiday was then scraped off, and the radius of the disbanded area was measured with a ruler. The cathodic disbondment radius data were summarized in Table 1.

The corrosion resistance of the painted panels was evaluated with an immersion test. The painted metal panels were cross-scribed on the surfaces prior to the test, and then immersed into a solution of 5% NaCl+0.6% $H_2O_2$ at 37° C. for 1 day. After 24 hours, 0.6% $H_2O_2$ was again added to the solution. After another 24 hours of immersion, the panels were removed from the test solution and dried. The coatings were then scraped-off along the scribe and the scribe creep was evaluated. The scribe creep data were summarized in Table 1.

The results demonstrate that Exs. 1 and 3 led to significantly reduced cathodic disbondment radius and scribe creep, compared with Ctrl. Ex., a control sample without any pretreatment. The Comp. Ex. demonstrates the importance of incorporating APS into the pretreatment coating formulation. Exs. 2 and 4, compared with Exs. 1 and 3, respectively, demonstrate that a high APS concentration is not desired—a higher APS concentration resulted in a lower degree of cathodic disbondment resistance.

Examples 5&6 and Control Samples B&C

A set of test panels (6"×12", A36 hot-rolled steel) were prepared at a paint shop of a major US shipyard. The mill scale on the steel substrate was removed with two types of surface preparation procedures, SSPC SP-10 (near white blast cleaning, 95% of the surface free of visible residues) and SSPC SP-6 (commercial blast cleaning, two-thirds of the surface area is free of all visible residues). Control panels without pretreatment (i.e., Ctrl. Exs. B and C) and panels with a pretreatment method according the present invention (i.e., Exs. 5 and 6) were painted with Intertuf 262, an epoxy paint from International Paints Ltd. The dry film thickness of the paint was about 8 mils (200 μm). The pretreatment solution was prepared by mixing precursor solutions (A) and (B) in a 1:1 weight ratio. The precursor (A) contained 0.02 M sodium metasilicate, 0.01 M calcium nitrate and 0.2 wt % APS; the precursor (B) contained 3.6 wt % Ancarez™ AR555 epoxy resin. The pretreatment solution was applied with a spray bottle. The treated surfaces were dried at ambient conditions overnight before being painted. After painting, the test panels were evaluated with a cathodic disbondment test and an outdoor exposure test.

The cathodic disbondment resistance is evaluated as per MIL-PRF-23236D and ASTM G8. In this test, a ⅜-inch (nominal) holiday was drilled through the coating to the metal for each 6"×12" test panel. The panels were installed in a plastic vessel and immersed in an electrolyte solution consisting of potable tap water with the addition of 1 wt % of each of the following technical grade salts, calculated on an anhydrous basis: sodium chloride, sodium sulfate, and sodium carbonate. The panels were electrically connected to a commercial magnesium anode conforming to paragraph 5.1.2 of ASTM test method ASTM G8. At the end of a 90-day test period, the test cell was disassembled, and the test panels were rinsed with warm tap water and wiped dry. The debonded paint around the holidays was then scraped with a knife, and the size of the disbondment area was evaluated with a ruler. The 90-day cathodic disbondment radius data for Exs. 5&6 and Ctrl. Ex. B&C are summarized in Table 2.

The outdoor exposure test was conducted in accordance with ASTM D-1014. The painted panels were scribed and placed on an outdoor exposure rack, at 45° facing south, at an ocean-front site. After exposure for a two-year time period, the loose paint along the scribes was scraped with a razor blade to evaluate the scribe creep, i.e., propagation of corrosion and coating delamination under the paint from the scribe line. The 2-year outdoor scribe creep data for Exs. 5&6 and Ctrl. Ex. B&C are summarized in Table 2.

Table 2 shows that the samples with pretreatment (i.e., Exs. 5 and 6) led to reduced cathodic disbondment radius and scribe creep as compared with the control samples (i.e., Ctrl. Exs. B and C). Ex. 6 had comparable performance with that for Ctrl. Ex. B in terms of cathodic disbondment resistance and outdoor scribe creep, indicating that a surface preparation of SP-10 may be replaced with SP-6 plus a pretreatment coating according to the present invention.

TABLE 2

| | Surface Preparation | Pretreatment | 90-day Cathodic Disbondment Radius (mm) | 2-year Outdoor Scribe Creep (mm) |
|---|---|---|---|---|
| Ctrl. Ex. B | SP-10 | No | 18.6 | 1.7 ± 0.4 |
| Ex. 5 | SP-10 | Yes | 16.1 | 0.9 ± 0.3 |
| Ctrl. Ex. C | SP-6 | No | 28.4 | 3.6 ± 0.6 |
| Ex. 6 | SP-6 | Yes | 18.8 | 1.7 ± 0.5 |

The present invention has been described with respect to the above exemplary embodiments. However, as those skilled in the art will recognize, modifications and variation in the specific details which have been described may be resorted to without departing from the spirit and scope of the invention as defined in the appended claims.

What is claimed is:

1. A pretreatment composition for steel surfaces to improve corrosion resistance, paint adhesion and cathodic disbondment resistance, consisting essentially of: water; at least one amino-functional silane; at least one of a dissolved silicate and a dissolved aluminate; a metal salt; and an epoxy resin dispersed in the form of particles; wherein:
a molar amount of amino-functional silane is at least two times lower than a stoichiometric amount that is needed for completing a crosslinking reaction with the epoxy resin and the concentration of the epoxy resin has a range of 0.25-2.5 wt %.

2. The pretreatment composition of claim 1 wherein the molar amount of amino-functional silane in the composition is at least ten times lower than the stoichiometric amount that is needed for completing the crosslinking reaction with the epoxy resin.

3. The pretreatment composition of claim 1 wherein the amino-functional silane has a general formula of $R_1—R_2—Si(OR_3)_3$ where $R_1$ is an amino functional group, $R_2$ is an aliphatic or aromatic hydrocarbon group and $R_3$ is an alkyl group.

4. The pretreatment composition of claim 3 wherein the amino-functional silane is selected from a group consisting of 3-aminopropyltriethoxysilane and N-(2-aminoethyl)-3-aminopropyltrimethoxysilane.

5. The pretreatment composition of claim 1 wherein the concentration of the amino-functional silane in the composition is in a range of 0.005-0.5 wt %.

6. The pretreatment composition of claim 1 wherein the concentration of the amino-functional silane in the composition is in a range of 0.015-0.15 wt %.

7. The pretreatment composition of claim 1 wherein the aluminate is selected from a group consisting of sodium aluminate, potassium aluminate and lithium aluminate.

8. The pretreatment composition of claim 1 wherein the concentration of the dissolved silicate or aluminate in the composition is in a range of 0.0025-0.05 M.

9. The pretreatment composition of claim 1 wherein the metal salt is selected from a group consisting of $Ba(NO_3)_2$, $Ca(NO_3)_2$, $Sr(NO_3)_2$, and $Fe(NO_3)_3$.

10. The pretreatment composition of claim 1 wherein the concentration of metal salt in the composition is in a range of 0.005-0.05 M.

11. The pretreatment composition of claim 1 wherein the particle size of the epoxy resin has a range of 0.05-20 μm.

12. A method of pretreating steel to improve corrosion resistance, paint adhesion and cathodic disbondment resistance, comprising the steps of:
(1) providing an aqueous precursor composition (A) containing at least one amino-functional silane, at least one of a dissolved silicate or a dissolved aluminate and at least a metal salt;
(2) providing an aqueous precursor composition (B) containing at least an epoxy resin dispersed in the form of particles;
(3) mixing precursor compositions (A) and (B) in a predetermined mixing ratio to make a pretreatment composition such that a molar amount of amino-functional silane in the pretreatment composition is at least two times lower than a stoichiometric amount that is needed for completing a crosslinking reaction with the epoxy resin in the pretreatment composition, the concentration of the epoxy resin in the pretreatment composition having a range of 0.25-2.5 wt %;
(4) wetting a steel surface with the pretreatment composition; and
(5) drying the wetted steel surface to form a partially crosslinked thin-film coating.

13. The method of claim 12 wherein the molar amount of amino-functional silane in the mixed composition is at least ten times lower than the stoichiometric amount that is needed for completing the crosslinking reaction with the epoxy resin in the mixed composition.

14. The method of claim 12 wherein the amino-functional silane in precursor composition (A) has a general formula of $R_1—R_2—Si(OR_3)_3$ where $R_1$ is an amino functional group, $R_2$ is an aliphatic or aromatic hydrocarbon group and $R_3$ is an alkyl group.

15. The method of claim 12 wherein the amino-functional silane in precursor composition (A) is selected from a group consisting of 3-aminopropyltriethoxysilane and N-(2-aminoethyl)-3-aminopropyltrimethoxysilane.

16. The method of claim 12 wherein either step (4) or step (5) is carried out at ambient conditions.

* * * * *